(12) United States Patent
Drax

(10) Patent No.: US 8,733,741 B2
(45) Date of Patent: May 27, 2014

(54) CATTLE GRID

(76) Inventor: Jeremy Ryton Drax, Wareham (GB)

( * ) Notice: Subject to any disclaimer, the term of this patent is extended or adjusted under 35 U.S.C. 154(b) by 817 days.

(21) Appl. No.: 12/305,070

(22) PCT Filed: Jun. 15, 2007

(86) PCT No.: PCT/GB2007/002236
§ 371 (c)(1),
(2), (4) Date: Aug. 10, 2009

(87) PCT Pub. No.: WO2007/144642
PCT Pub. Date: Dec. 21, 2007

(65) Prior Publication Data
US 2010/0001245 A1 Jan. 7, 2010

(30) Foreign Application Priority Data

Jun. 16, 2006 (GB) .................................. 0612000.0

(51) Int. Cl.
*E01B 17/00* (2006.01)
(52) U.S. Cl.
USPC .............................................. 256/17; 119/528
(58) Field of Classification Search
USPC ........... 119/528; 256/15–17; 49/33, 109, 132, 49/131, 133, 134; 14/73
See application file for complete search history.

(56) References Cited

U.S. PATENT DOCUMENTS

| 946,478 A * | 1/1910 | White ............................... 49/133 |
| 1,345,145 A * | 6/1920 | Dominguez .................. 119/416 |
| 1,428,904 A | 9/1922 | Rand |
| 1,523,267 A | 1/1925 | Leonard |
| 1,539,177 A | 5/1925 | Gardhouse |
| 1,579,125 A | 3/1926 | Marshall et al. |
| 1,607,689 A | 11/1926 | Rand |
| 1,616,361 A | 2/1927 | Frnka |
| 2,024,063 A | 12/1935 | Roper |
| 2,622,354 A | 12/1952 | Bacon |
| 6,038,717 A * | 3/2000 | Persson ............................ 5/607 |
| 7,118,304 B2 * | 10/2006 | Turpin et al. .................... 404/6 |

FOREIGN PATENT DOCUMENTS

| FR | 2 183 164 A | 12/1973 |
| GB | 2 216 579 A | 10/1989 |

* cited by examiner

*Primary Examiner* — Kimberly Berona
*Assistant Examiner* — Joshua Huson
(74) *Attorney, Agent, or Firm* — Harness, Dickey & Pierce, P.L.C.

(57) ABSTRACT

A cattle grid comprising a first group of fixed bars (12) that are spaced apart with gaps therebetween and a second group of bars (20) that are movable between a lower position and an upper position. With the bars of the cattle grid in a first configuration, the second group of bars (20) are in the lower position, such that the upper portions of the bars of the second group (20) are lower than the upper portions of the bars of the first group (12), whereby gaps are defined between the bars of the first group to provide a barrier to the passage of animals. When the set of bars are in a second configuration, the second group of bars (20) are in the upper position such that the second group of bars (20) intermeshes with the first group of bars (12) so that the bars of the second group (20) occupy the gaps between the bars of the first group (12) to allow passage of animals across the bars.

9 Claims, 7 Drawing Sheets

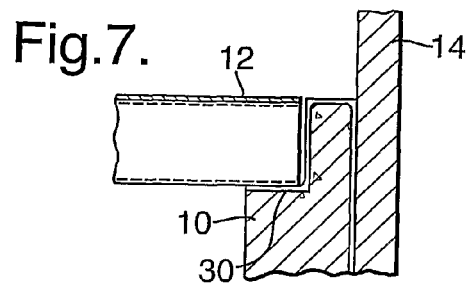
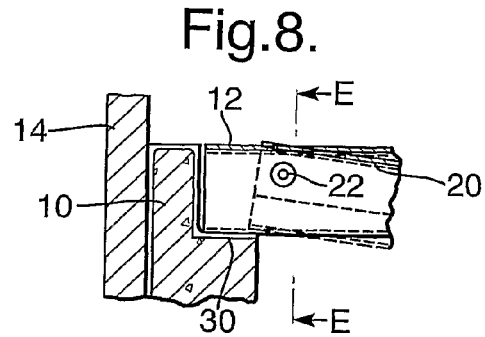
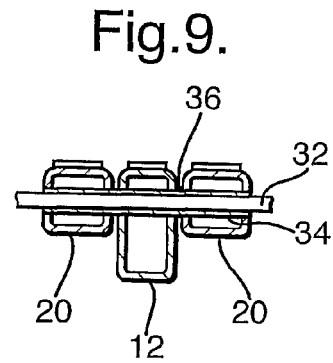
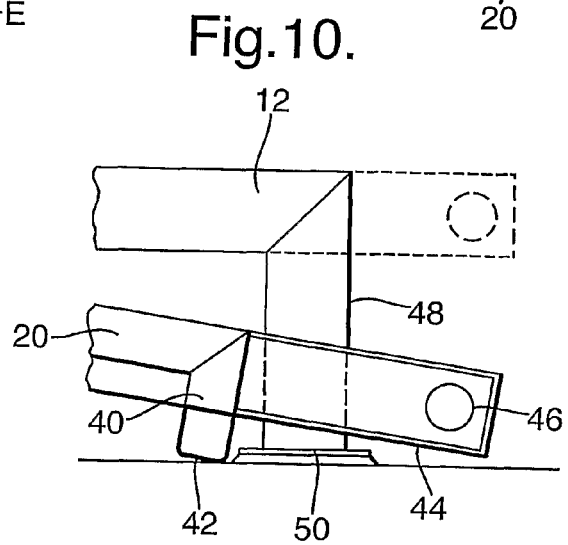
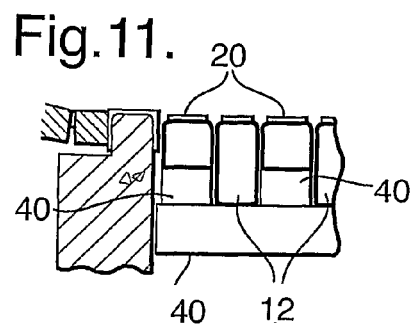

CATTLE GRID

CROSS-REFERENCE TO RELATED APPLICATIONS

This application is a 371 U.S. National Stage of International Application No. PCT/GB2007/002236, filed Jun. 15, 2007 and published in English as WO 2007/144642 A1 on Dec. 21, 2007. This application claims the benefit of British Patent Application No. GB 0612000.0, filed Jun. 16, 2006. The disclosures of the above applications are incorporated herein by reference.

This invention relates to cattle grids. Conventional cattle grids are known which consist of a plurality of spaced bars fixed horizontally over a pit, the tops of the bars being level with the surface of a road or track passing over the grid. Pedestrians and wheeled traffic may pass over the grid, but animals will not cross the grid because of the sense of insecurity experienced when placing hooves on the grid. Thus the grid serves the purpose of a selective gate which is permanently closed to animals, but open to humans and wheeled vehicles.

The term "cattle grid" is a commonly used expression for the type of grid described above. It is, of course, understood that the use of this expression herein is not intended to limit the application of such a device to "cattle", but it can be used with any suitable animals (including birds) such as cattle, sheep, deer, other farm livestock, horses, camels and so forth. The term "cattle grid" is also merely one term used in the art for this type of device; other terms include "cattle guard", "vehicle pass" and "Texas gate". Use of the term "cattle grid" herein encompasses all equivalent expressions.

However, there is the problem with the conventional type of cattle grid because in order to allow livestock to pass, an additional conventional gate must be provided in the fence, hedge or wall, adjacent to the cattle grid to enable animals to be moved. This requires considerable extra width to be provided for the road or track to accommodate the cattle grid and gate. There is also the problem that people riding on horseback, or horse-drawn vehicles, must stop in order to open the adjacent gate and close it behind them, which is troublesome and inconvenient. If conventional gates are provided, there is also a visual impact, whereas cattle grids provide an unobstructed view along the road or track.

The present invention is concerned with reducing or eliminating any of the above problems.

According to one aspect of the present invention there is provided a cattle grid comprising a set of bars having a first configuration in which the upper portions of the bars are spaced apart to define gaps therebetween, and a second configuration in which the gaps between the upper portions of the bars are substantially reduced to allow passage of animals across the bars, wherein the set of bars comprises: a first group of fixed bars that are spaced apart with gaps therebetween; and a second group of bars that are moveable between a lower position and an upper position to change the set of bars between the first and second configurations, wherein the first configuration of the set of bars comprises the second group of bars being in the lower position such that the upper portions of the bars of the second group are lower than the upper portions of the bars of the first group, whereby gaps are defined between the bars of the first group, and wherein the second configuration comprises the second group of bars being in the upper position such that the second group of bars intermeshes with the first group of bars so that the bars of the second group occupy the gaps between the bars of the first group.

According to another aspect of the present invention there is provided a cattle grid comprising a set of bars having a first configuration in which the upper portions of the bars are spaced apart to define gaps therebetween, and a second configuration in which the gaps between the upper portions of the bars are substantially reduced to allow passage of animals across the bars, wherein each bar of the set of bars has at least a narrow longitudinal face and a broad longitudinal face, and is rotatable about an axis parallel to the longitudinal direction of the bar to change the set of bars between the first and second configurations, wherein the first configuration of the set of bars comprises the narrow longitudinal faces of the bars being uppermost such that gaps are defined between the bars, and wherein the second configuration of the bars comprises the broad longitudinal faces of the bars being uppermost such that the gaps between the upper portions of the bars are substantially reduced, and wherein, for each bar, the distance between said axis and the narrow face of the bar is substantially the same as the distance between said axis and the broad face of the bar.

Embodiments of the invention will now be described, by way of example only, with reference to the accompanying drawings in which:

FIG. 7 is a sectional view along line D-D of FIG. 2;

FIG. 8 is a detail of portion I of FIG. 6(a);

FIG. 9 is a section along line E-E of FIG. 8;

FIG. 10 is a detail view of portion II of FIG. 6(a);

FIG. 11 is a detail view of portion III of FIG. 5;

A first embodiment of a cattle grid according to the invention will now be described.

Figure 1:
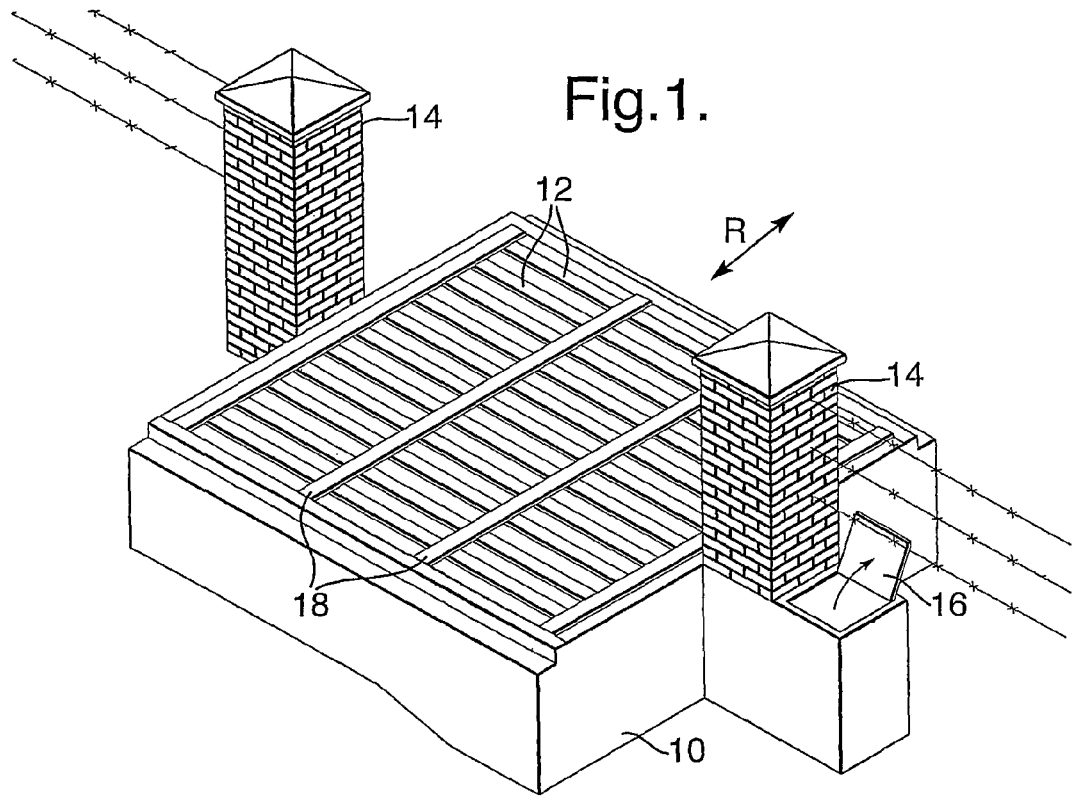
FIG. 1 is an isometric view of a cattle grid according to a first embodiment of the invention with the bars in a first configuration.
Figure 2:
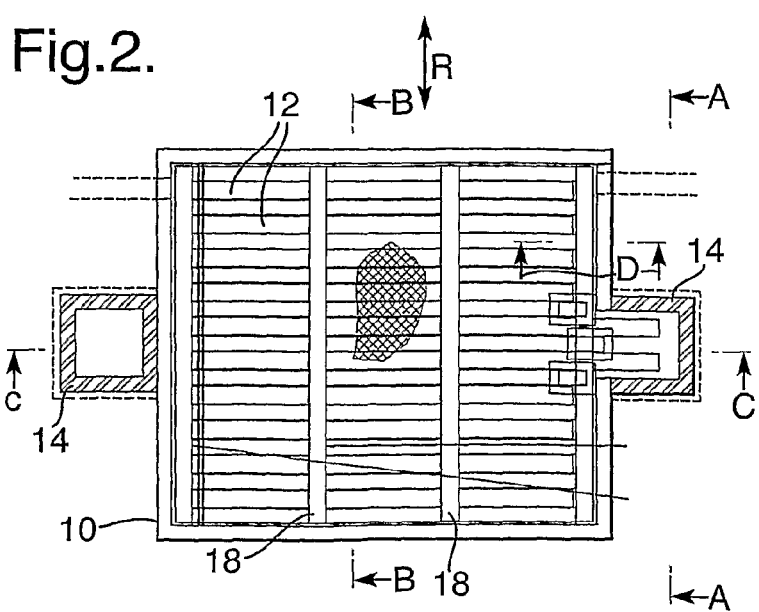
FIG. 2 is a plan view of the cattle grid of FIG. 1.

FIG. 1 shows the cattle grid in a first state or configuration in which it appears very similar to a conventional cattle grid. It comprises a rectangular reinforced concrete pit 10 across which are laid a first group of parallel bars 12. The concrete pit 10 could be pre-cast or could be poured in situ using appropriate shuttering. Alternatively, the pit 10 could be constructed of steel instead of concrete, and again the steel pit 10 could be prefabricated or constructed in situ.

In the example illustrated in FIG. 1, the lengths of the sides of the pit 10 are in the region of 2.5 m to 3.5 m, but clearly it can be sized to suit the particular application and the necessary width of the track or road which is to pass over the cattle grid. The track or road runs in the direction indicated by the arrow R in FIG. 1 and the bars 12 are arranged transverse to the direction of the road or track. At each side of the pit 10, a pier 14 is provided, in this example of masonry construction, which can support fencing. An access hatch 16 can be provided adjacent to one of the piers 14 to provide access to the machinery of the cattle grid as will be described in further detail below.

The upper surfaces of the bars 12 are, of course, provided level with the surface of the road or track which passes over the cattle grid, such that the pit 10 is, in fact, buried in the ground. As shown by the hatching on the bars 12, their upper surfaces may be provided with an anti-skid surface, such as protrusions, ridges, corrugations, mesh or the like. Further longitudinal members 18 are provided fixed to the bars 12 to secure the bars 12 in place with uniform spacing.

Figure 3:
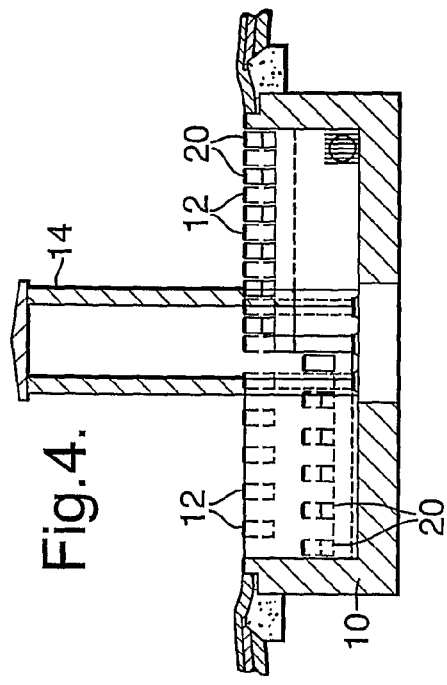
FIG. 3 is a cut-away sectional view along line A-A of FIG. 2 showing the bars of the cattle grid in a second configuration.
Figure 5:
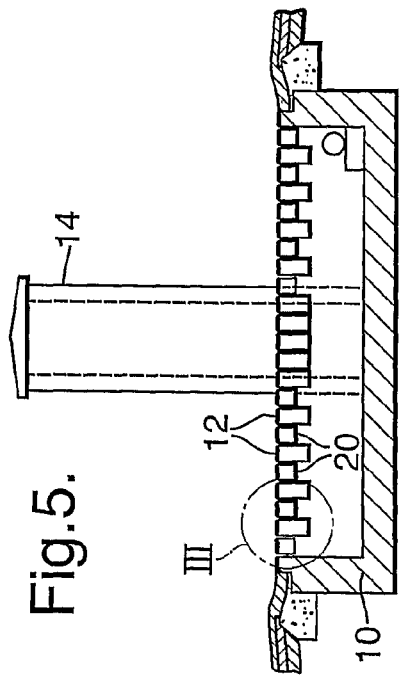
FIG. 5 is a sectional view along line B-B of FIG. 2 showing the bars of the cattle grid in the second configuration.

The cattle grid according to this embodiment of the invention comprises a second group of parallel bars 20, not visible in FIG. 1 because they are lowered to a position within the pit 10. The second group of bars can be raised to an upper position in which they intermesh with the first group of bars to occupy the gaps between the first group of bars and provide a flat substantially continuous surface across which animals can pass. FIGS. 3 and 5 shows the cattle grid in vertical longitudinal cross-section in which the set of bars comprising the first group of fixed bars 12 and the second group of movable bars 20 are in the above-described second configuration.

Figure 4:
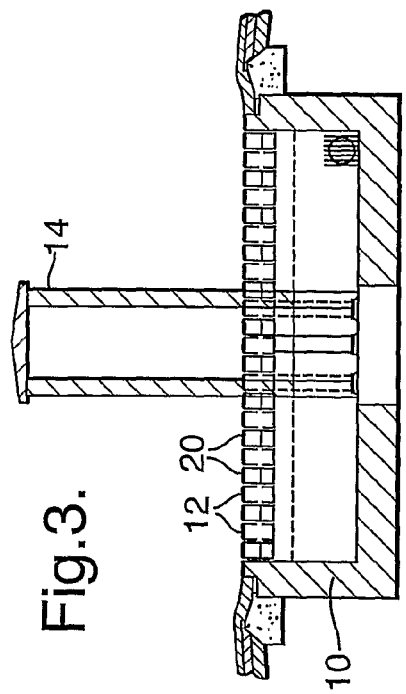
FIG. 4 is a further sectional view along line A-A showing bars of the cattle grid in both a first and second configuration.

FIG. 4 is a composite cross-section in which the left hand side shows the set of bars 12, 20 in the first configuration in which the second group of bars 20 are in a lower position in which their upper surfaces are below the upper surfaces of the first group of bars 12, and the gaps between the first group of bars 12 are exposed such that the grid provides a barrier to the passage of animals. In the right hand portion of FIG. 4, the set of bars are shown in the second configuration in which the second group of bars 20 intermesh with the first group of bars 12 to fill the gaps between the first group of bars 12.

In this preferred embodiment, the first group of bars 12 are constructed of metal with a rectangular hollow section of 100 mm by 200 mm with their narrower faces uppermost. The bars 20 of the second group are of square hollow section 120 mm by 120 mm. The bars, of course, do not have to have hollow sections, but could, for example be in the form of beams of various sections, such as I-shaped or L-shaped or solid beams.

Figure 6A:
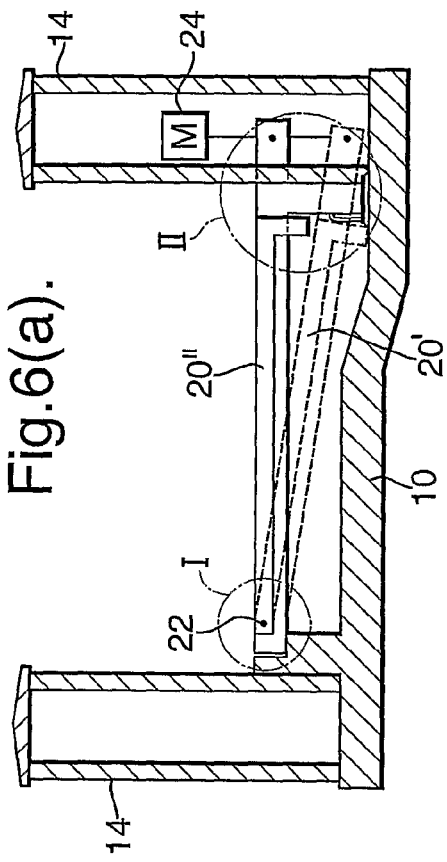
FIG. 6(a) is a section along line C-C of FIG. 2 showing bars of the cattle grid in both the first and second configurations.

FIG. 6(a) is a transverse cross-sectional view of the cattle grid and shows one bar 20' of the second group in the lower position of the first configuration of the cattle grid bars and shows a bar 20" of the second group of bars in the upper position according to the second configuration of the cattle grid bars. As can be seen in FIG. 6(a), the second group of bars 20 are hinged at one end by means of hinge 22 to permit raising and lowering between the lower and upper positions. The total range of the angle of rotation of the second group of bars 20 about the hinge 22 is less than 45 degrees, preferably less than 30 degrees, and in this embodiment is less than 15 degrees. A motor 24 is provided in one of piers 14 for raising and lowering the second group of bars 20. The motor 24 drives any suitable lifting gear within the pier 14, such as chains, cables, levers, screw jacks, or hydraulic rams to move the bars 20 between the lower and upper positions.

Figure 6B:
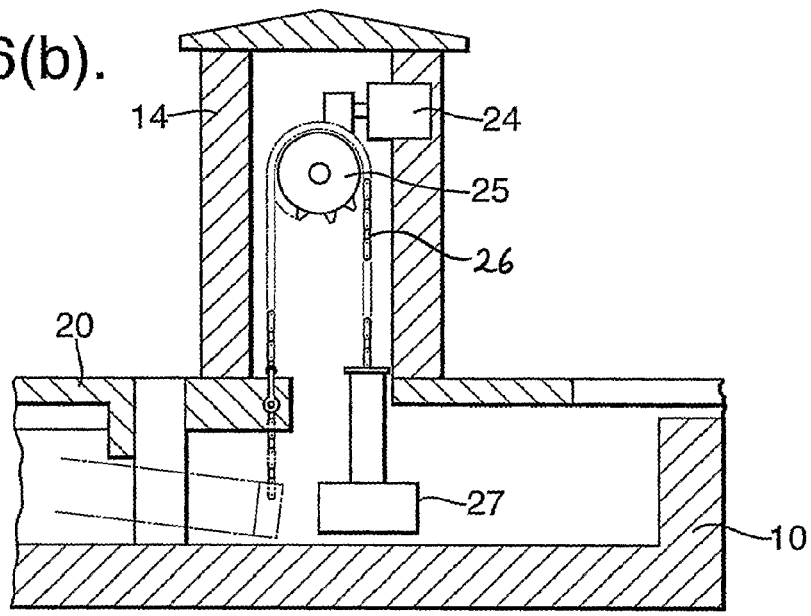
FIG. 6(b) shows in greater detail the raising/lowering mechanism of the right-hand portion of FIG. 6(a) according to one design.

One arrangement is shown in FIG. 6(b) in which the motor 24 drives a sprocket wheel 25 around which passes a chain 26. One end of the chain 26 is attached to the movable bars 20 and a counterweight 27 hangs from the other end of the chain 26. The motor 24 rotates the sprocket wheel 25 one way to raise the bars 20 and lower the counterweight 27, and rotates the sprocket wheel 25 the other way to lower the bars 20 and raise the counterweight 27. The advantage of using a counterweight 27 is that it reduces the work that needs to be done by the motor 24, so a much less powerful motor 24 can be used. In fact if the counterweight 27 is half the weight of the movable bars 20, then no net work is done by the motor 24 in moving the bars; the motor 24 just needs to overcome friction and the inertia of the components.

Figure 6C:
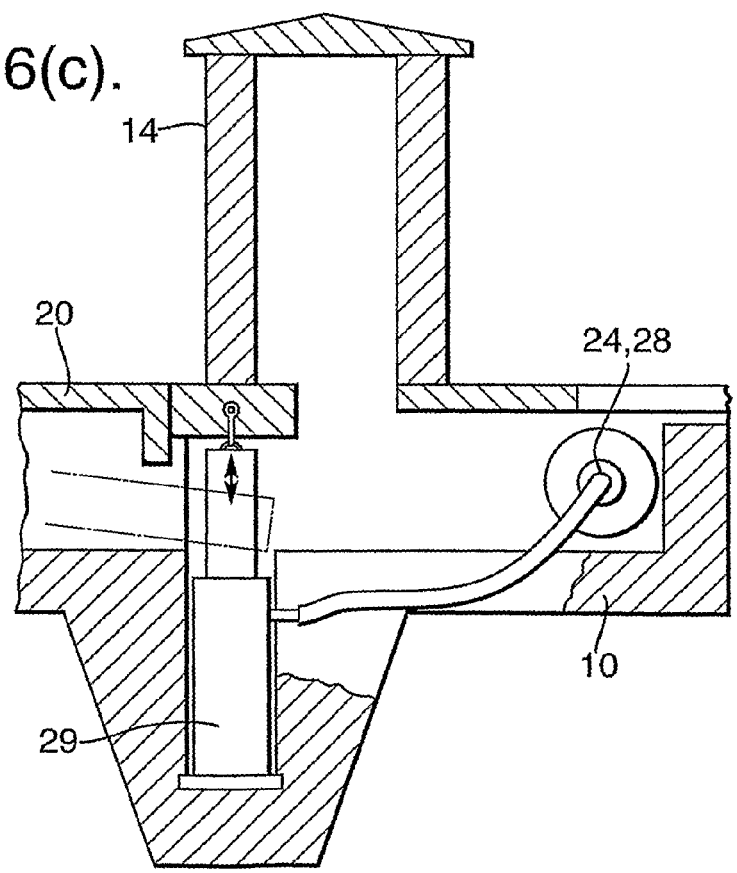
FIG. 6(c) shows in greater detail the raising/lowering mechanism of the right-hand portion of FIG. 6(a) according to another design.

Another arrangement is shown in FIG. 6(c) in which the motor 24 drives a hydraulic pump 28 which then drives a hydraulic ram 29 to raise or lower the bars 20.

In any arrangement, the motor 24 may be electrically powered, for example via cables from an electricity supply grid, or from solar panels in conjunction with battery storage, or from rechargeable batteries.

Controls (not shown) to operate the motor 24 to raise and lower the second group of bars 20 may be provided in one of the piers 14, and a receiver (not shown) can be provided in one of the piers 14 for receiving signals from a remote control unit (not shown) which also operates the motor mechanism. The remote control unit can be carried by, for example, a horse rider, or driver of a horse drawn vehicle, to operate the cattle grid mechanism from a distance, such that it is unnecessary to dismount, and also if operated sufficiently in advance, it is unnecessary to stop because the set of bars of the cattle grid can be operated to be in the second configuration to allow passage of horses before the rider or driver reaches the cattle grid. After the cattle grid has been crossed, the remote control can then be used to return the cattle grid to the first configuration with the second group of bars lowered to prevent straying of livestock.

Additionally, a manual system, for example operated by a lever, crank or wheel (not shown) on one of the piers 14 is provided in the event of failure of the electric, solar or battery-powered system. Safety interlocks (not shown) can also be provided to stop the mechanism from operating in the event of obstruction of motion of the bars to prevent injury and avoid damage to the mechanism. A small clearance, such as 20 mm, can be provided between adjacent bars when in the raised position to avoid trapping small objects.

FIG. 7 shows the right hand end of one of the fixed bars 12 resting on a steel support 30. The support 30 has an L-shaped angle portion located on a ledge provided at the top of the concrete wall of the pit 10 which bears the weight of the bars 12. The support 30 also has an inverted U-shaped portion which provides a cap over the top of the upwardly projecting lip of the pit 10. These two portions of the support 30 can be provided separately or can be made as a single S-shaped member. The steel support 30 protects the edge of the pit 10 and prevents spalling of the concrete. A steel cap is preferably provided around the entire upper rim of the pit 10, even on the edges which are not supporting the ends of the bars of the cattle grid.

The majority of the movable bars 20 of the second group of bars are shorter than the fixed bars 12 of the first group of bars, such that they do not rest on the support 30 and can be lowered below the level of the fixed bars 12.

FIG. 8 shows the opposite end of the bar 12 resting on another support 30. The hinge 22 of the movable bars 20 can be seen in FIG. 8 and is shown in more detail in the cross-section of FIG. 9. The hinge comprises a 25 mm diameter rod 32 within a sleeve 34, and 8 mm thick spacer washers 36 are provided between adjacent bars 12, 20.

Referring to FIGS. 10 and 11, the majority of the movable bars 20 have downwardly projecting portions 40 welded on their ends distal to the hinge 22 and a longitudinal member 42 is welded to the bottom of these portions 40 to fix the bars 20 together such that they can be raised and lowered in unison. Two of the movable bars 20 which lie at the middle of the grid between the piers 14 are of larger cross-section, such as 120 mm by 200 mm and have projecting lifting arm portions 44 which extend beyond the ends of the fixed bars 12 and into one of the piers 14. These two larger bars are also attached to the longitudinal member 42. The end of each lifting arm portion 44 is provided with an eye 46 for coupling to the lifting gear. The end of each lifting arm portion 44 is detachable for maintenance. FIG. 10 shows the moveable bars 20, including the lifting arm portions 44 in their lower position, but also shows in dashed outline the position of the lifting arm portion when in the upper position.

When the lifting arm portions 44 are raised or lowered, this motion is transmitted via the longitudinal member 42 to all of the other movable bars 20 to raise or lower them. The longitudinal member 42 is also provided to rest on the bottom of the pit 10 when the movable bars 20 are in their lower position.

The fixed bars 12 on each side of the lifting arm portions 44 cannot rest on support 30 as shown in FIG. 7 because of the necessity to provide clearance for the motion of the lifting arm portions 44. Instead, the fixed arms 12 on either side of the lifting arm portions 44 are welded to downwardly projecting leg portions 48 which are welded to base plates 50 anchored to the floor of the pit.

A de-mountable lifting beam (not shown) can be located to span between the piers 14 near their tops to enable the grid comprising the set of bars 12, 20 to be lifted clear of the pit 10 using a block and tackle system. This enables easy maintenance of the pit below. The pit 10 can also be provided with an outlet pipe for drainage and with a ramp and/or pipe to permit smaller creatures, such as hedgehogs, to crawl out of the pit so that they do not become trapped.

A second embodiment of a cattle grid according to the invention will now be described. Like parts are indicated in the drawings with like reference numerals and a description of constructional details and features that are common with the first embodiment will be omitted to avoid unnecessary repetition.

Figure 12:
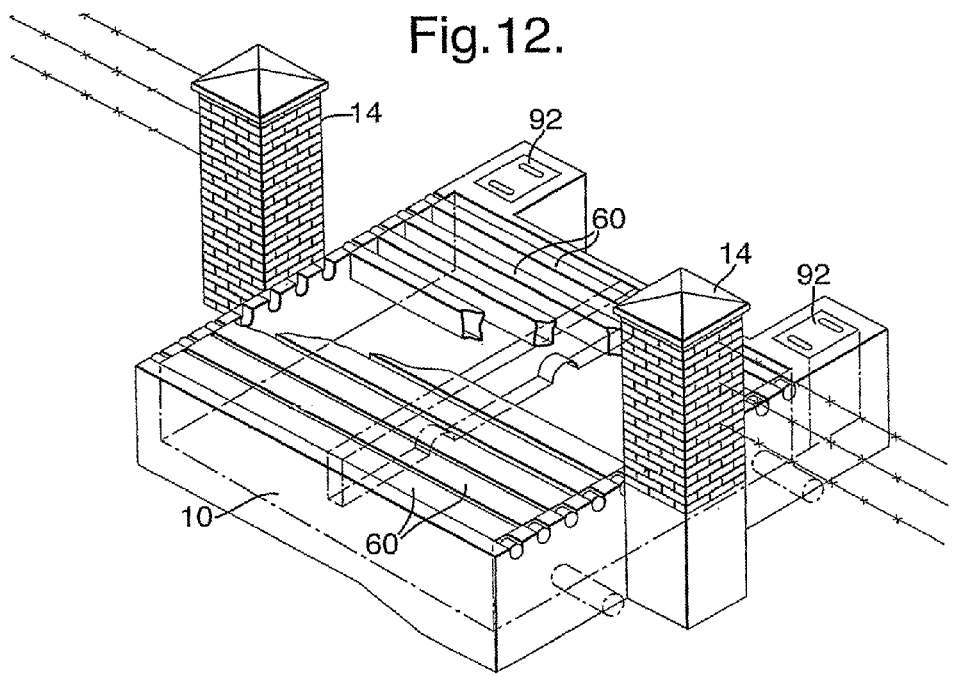
FIG. 12 is an isometric view of a cattle grid according to a second embodiment of the invention.
Figure 13:
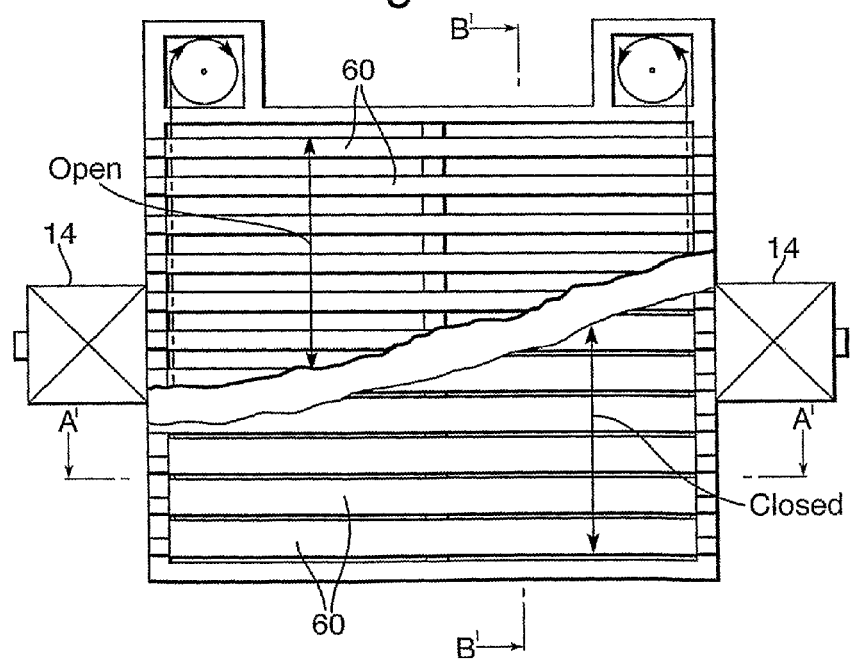
FIG. 13 is a plan view of the cattle grid of FIG. 12.

FIGS. 12 and 13 are composite drawings in which the upper portions show the set of bars 60 in a first configuration, and the lower portions of the Figures show the set of bars 60 in a second configuration. The bars 60 are all essentially identical, and in this embodiment are 200 mm by 100 mm rectangular hollow section metal bars. Other shapes of bar are, of course, possible, provided the bars have two faces 60a, 60b of different widths and are rotatably mounted to enable the different width faces to be presented uppermost. In the first configuration, the bars have one of their narrower longitudinal faces 60a uppermost such that the appearance is of a conventional cattle grid with parallel bars 60 spaced apart to define gaps therebetween to act as a barrier to livestock. In the second configuration, the bars 60 are rotated such that one of their broader longitudinal faces 60b is uppermost such that there are substantially no gaps between the bars, other than minor clearance gaps, and so they define a continuous level surface across which animals may pass. The broad faces 60b of the bars 60 (uppermost in the second configuration) are provided with an anti-skid surface, in addition to the narrow faces 60a of the bars 60 (uppermost in the first configuration), as described in the first embodiment of the invention. The narrow and broad faces 60a and 60b of the bars are labelled and illustrated more clearly in, for example, FIGS. 22 and 23 discussed later below.

Figure 14:
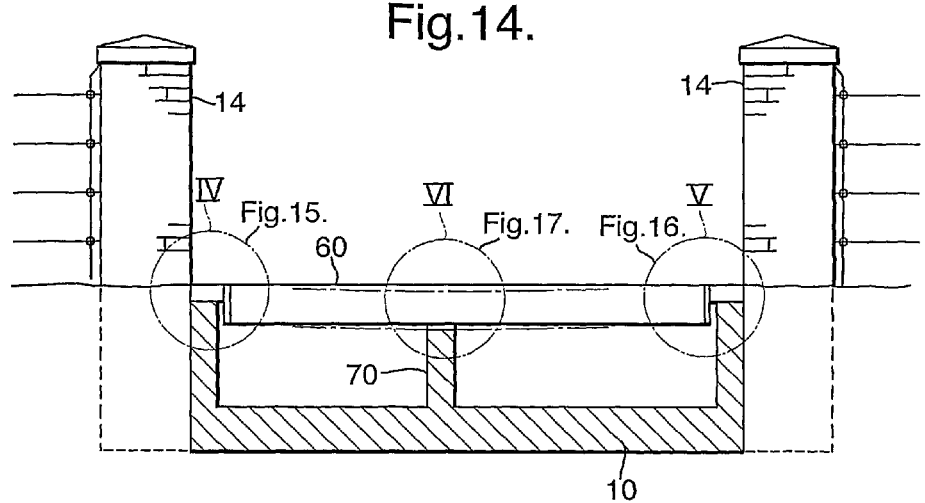
FIG. 14 is a sectional view along line A'-A' of FIG. 13.
Figure 15:
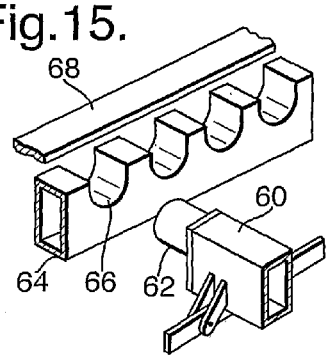
FIG. 15 is a detail of portion IV of FIG. 14.
Figure 16:
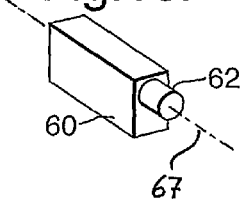
FIG. 16 is a detail of portion V of FIG. 14, showing the end of one of the bars of the cattle grid.

FIG. 14 shows a vertical section to the cattle grid parallel to the longitudinal direction of the bars 60. As shown in FIGS. 15 and 16, each end of each bar 60 is provided with a projecting cylindrical pivot 62 and the upper edges of opposite walls of the pit 10 are each provided with a pivot housing 64. Each pivot housing 64 is made of 200 mm by 100 mm rectangular hollow section metal bar in which slots 66 are provided. The slots 66 have a semi-circular bottom profile for receiving the pivots 62 and the slots 66 are provided with PTFE or similar low friction bearing surfaces such that the bars 60 can freely rotate about the pivots 62 resting in the slots 66. The centre axis of each cylindrical pivot 62 defines a rotation axis 67 for the bar 60. The rotation axis 67 is substantially equidistant from the broad face 60b and the narrow face 60a of the bar 60. Each pivot housing 64 is provided with a cover plate 68 which is shown in FIG. 15 lifted away from the pivot housing 64. In use, each cover plate 68 is fixed by screws to its pivot housing 64 to cover the tops of the slots 66. The cover plate 68 prevents the ingress of dirt and grit into the slots 66 which might otherwise increase the friction of the bearing surfaces, impeding the rotation of the bars 60. The cover plate 68 also serves to retain the pivots 62 in their slots 66, preventing them from riding up.

Figure 17:
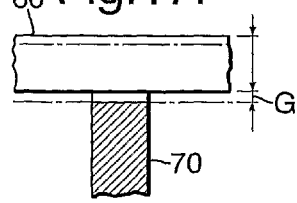
FIG. 17 is a detail of portion VI of FIG. 14.

A wall 70 is provided across the middle of the pit 10 perpendicular to the longitudinal direction of the bars 60. As shown in FIG. 17, a clearance gap G is provided between the bottom of the bars 60 and the top of the wall 70 such that the bars 60 can freely rotate. However, as shown by the dashed lines in FIGS. 14 and 17, when a heavy vehicle is crossing the cattle grid, the bars 60 deflect such that they rest on the top of the wall 70 to provide additional mid-span support for bearing the load of the vehicle.

Figure 18:
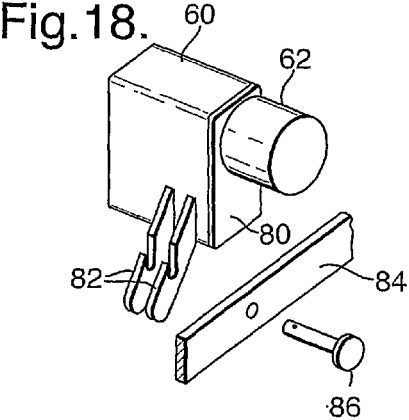
FIGS. 18 and 19 are views showing the details of the attachment of a bar of the cattle grid to a connecting rod.
Figure 19:
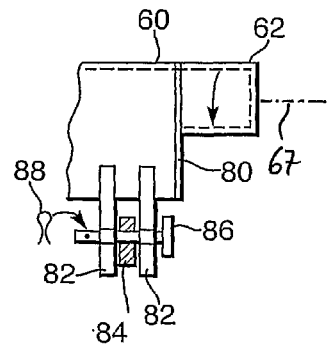

Referring to FIGS. 18 and 19, each end of each bar 60 is provided with an end plate 80, on to which is welded the pivot 62. Each end of each bar 60 is also provided with welded cams 82 which can receive between them a connecting rod 84. The connecting rod 84 is joined to the cams 82 by a pin 86 kept in place by a split pin retainer 88.

In total two connecting rods 84 are provided, one at each end of the bars 60, and the connecting rods run perpendicular to the longitudinal direction of the bars 60. The connecting rods 84 join the cams 82 of the bars 60 together, such that the bars 60 rotate in unison.

Figure 20:
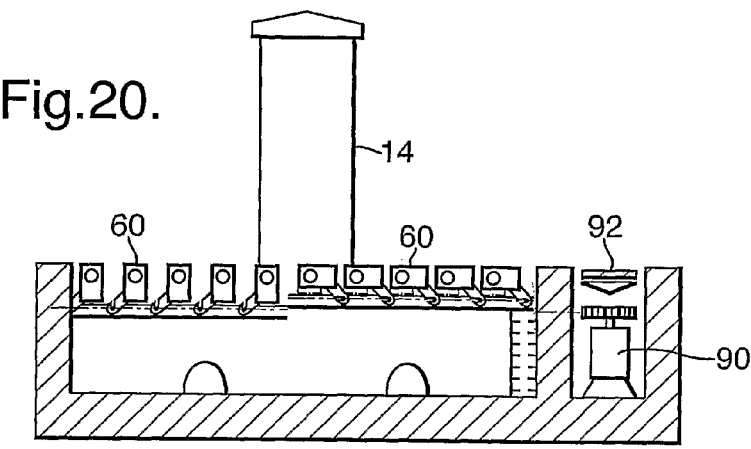
FIG. 20 is a sectional view along lines B'-B' of FIG. 13.
Figure 21:
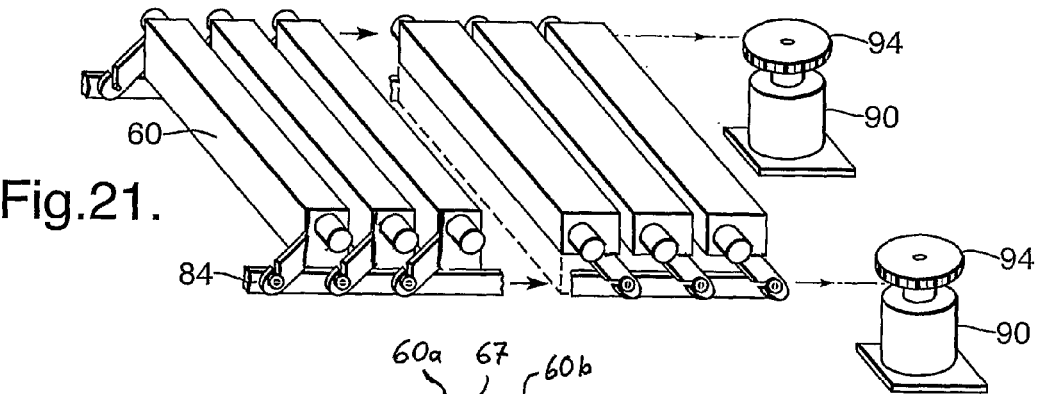
FIGS. 21, 22, 23 and 24 are views of the bars of the cattle grid and connecting rod mechanism illustrating the motion between the first and second configurations of the bars.
Figure 22:
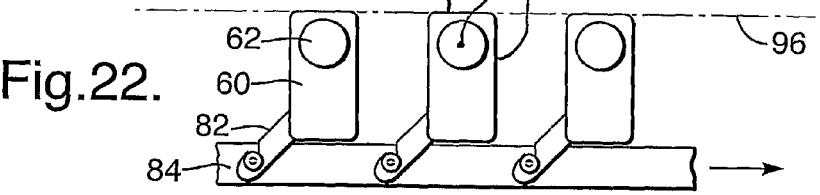

When the bars 60 are in their first configuration, their narrow surface 60a is uppermost, as shown in the left hand portion of FIGS. 20 and 21, and as shown in FIG. 22. A pair of motors 90 is provided in pits set in the ground accessible by hatches 92. Each motor 90 is arranged to operate a respective connecting rod 84. In the illustrated embodiment, each motor 90 drives a rotatable drum 94 which is coupled to a respective connecting rod 84 by a cable or chain. However, other mechanisms for driving the connecting rods 84 are possible, for example levers, cranks, screws, hydraulic cylinders and so forth. When each motor 90 is actuated, the connecting rods 84 are pulled in the direction shown by the arrows in FIGS. 21 to 24 (that is to the right hand side of these figures). The connecting rods 84 act on the cams 82 to rotate the bars 60 anti-clockwise about their pivots 62 such that they are moved to adopt their second configuration as shown in the right hand portion of FIGS. 20 and 21, and in FIG. 23. FIG. 24 shows the two configurations superimposed to assist in illustrating the transition between the first and second configuration.

Figure 23:
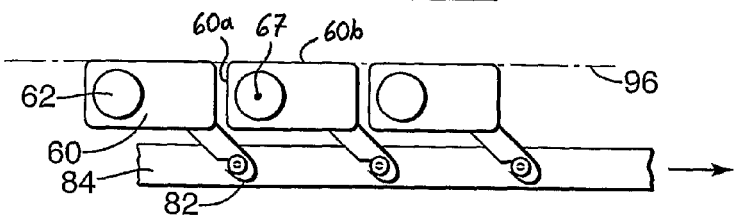
Figure 24:
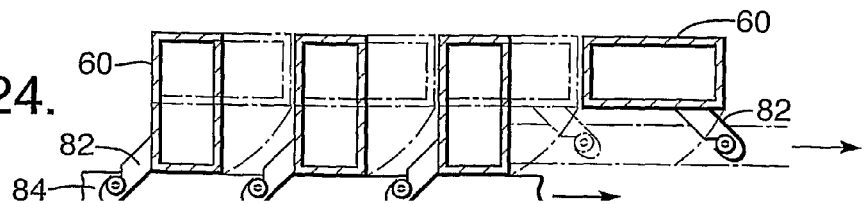

When the bars 60 are in the second configuration as shown in FIG. 23, each connecting rod 84 must be held in that position, for example by locking of the respective motor 90, because each pivot 62 is displaced from the centre of each bar 60, such that there is a torque tending to rotate the bars 60 back to their first configuration, both under the weight of the bars themselves and also the weight of any load placed on the bars such as animals crossing. By releasing the lock on each motor 90 holding its respective connecting rod 84, the bars 60 will naturally return from their second configuration in FIG. 23 to their first configuration in FIG. 22 simply under gravity. It would, of course, be possible to provide the pivots 62 centrally with respect to the bars 60, but the arrangement embodying the invention as illustrated in FIGS. 22 and 23, in which the rotation axis 67 of the pivots 62 is substantially equidistant from the broad face 60*b* and the narrow face 60*a* of the bar 60 means that the level of the upper surfaces 96 of the bars providing the road or track is unchanged between the two configurations.

By removing the pins 86 that join the cams 82 of a bar 60 to the connecting rods 84, and removing the cover plates 68, each bar 60 can individually be lifted clear of the cattle grid to allow easy access for cleaning and maintenance of the pit and cattle grid mechanism.

The invention claimed is:

1. A cattle grid comprising a set of bars having a first configuration in which the upper portions of the bars are spaced apart to define gaps therebetween, and a second configuration in which the gaps between the upper portions of the bars are substantially reduced to avow passage of animals across the bars,
   wherein the set of bars comprises: a first group of fixed bars that are spaced apart with gaps therebetween; and a second group of bars that are moveable between a lower position and an upper position to change the set of bars between the first and second configurations,
   wherein the first configuration of the set of bars comprises the second group of bars being in the lower position such that the upper portions of each of the bars of the second group are lower than the upper portions of the bars of the first group, whereby gaps are defined between the bars of the first group, and wherein the second configuration comprises the second group of bars being in the upper position such that the second group of bars intermeshes with the first group of bars so that the bars of the second group occupy the gaps between the bars of the first group, so that the upper portions of the bars of the first and second group of bars cooperate to provide a substantially stationary surface that allows the passage of animals while in the second configuration.

2. The apparatus according to claim 1, wherein the second group of bars are hinged at one end for movement between the lower position and the upper position about a substantially horizontal hinge axis that is perpendicular to the longitudinal direction of the bars.

3. The apparatus according to claim 2, wherein the angular motion of the second group of bars between the lower position and the upper position about the hinge axis is less than 15 degrees.

4. The apparatus according to claim 1, wherein the bars of the second group are fixed to each other by at least one member perpendicular to their length such that the bars of the second group are moveable in unison between the lower and upper positions.

5. The apparatus according to claim 1, further comprising at least one lifting arm fixed to and extending beyond the end of the second group of bars, such that actuation of the or each lifting arm is effective to move the second group of bars between the lower and upper positions.

6. The apparatus according to claim 1, wherein each bar is substantially rectangular in cross-section.

7. The apparatus according to claim 1, wherein the upper portions of the bars in at least one configuration are provided with an anti-skid surface.

8. The apparatus according to claim 1, wherein the upper portions of the bars in at least one configuration are provided at ground level.

9. The apparatus according to claim 1, wherein the set of bars are provided over a pit in the ground.

* * * * *